(12) United States Patent
Liu

(10) Patent No.: US 12,493,731 B2
(45) Date of Patent: Dec. 9, 2025

(54) MULTIPLE PATTERN METAL FUSE DEVICE, LAYOUT, AND METHOD

(71) Applicant: TAIWAN SEMICONDUCTOR MANUFACTURING COMPANY, LTD., Hsinchu (TW)

(72) Inventor: Hsiang-Wei Liu, Hsinchu (TW)

(73) Assignee: TAIWAN SEMICONDUCTOR MANUFACTURING COMPANY, LTD., Hsinchu (TW)

(\*) Notice: Subject to any disclaimer, the term of this patent is extended or adjusted under 35 U.S.C. 154(b) by 527 days.

(21) Appl. No.: 17/576,907

(22) Filed: Jan. 14, 2022

(65) Prior Publication Data

US 2022/0415911 A1 Dec. 29, 2022

Related U.S. Application Data

(60) Provisional application No. 63/214,473, filed on Jun. 24, 2021.

(51) Int. Cl.
*G06F 30/392* (2020.01)
*H01L 23/525* (2006.01)
*H10B 20/20* (2023.01)
*H10B 20/25* (2023.01)

(52) U.S. Cl.
CPC ........ *G06F 30/392* (2020.01); *H01L 23/5256* (2013.01); *H10B 20/20* (2023.02); *H10B 20/25* (2023.02)

(58) Field of Classification Search
CPC ....... H10B 20/20; H10B 20/25; G06F 30/392; H01L 23/5256
See application file for complete search history.

(56) References Cited

U.S. PATENT DOCUMENTS

| | | | |
|---|---|---|---|
| 6,825,114 B1* | 11/2004 | Fisher | H01L 21/32139 438/770 |
| 7,260,442 B2 | 8/2007 | Hwang et al. | |
| 9,123,656 B1 | 9/2015 | Hsieh et al. | |
| 9,256,709 B2 | 2/2016 | Yu et al. | |
| 2005/0040491 A1* | 2/2005 | Lee | H01L 23/5258 257/E23.15 |
| 2012/0306048 A1* | 12/2012 | Li | G11C 17/16 257/E23.149 |
| 2014/0040838 A1 | 2/2014 | Liu et al. | |
| 2014/0319650 A1* | 10/2014 | Coyner | H01L 23/53295 438/467 |

(Continued)

FOREIGN PATENT DOCUMENTS

| | | |
|---|---|---|
| TW | 201316494 | 4/2013 |
| TW | 201409656 | 3/2014 |

(Continued)

*Primary Examiner* — Fernando L Toledo
*Assistant Examiner* — Marshall Mu-Nuo Hatfield
(74) *Attorney, Agent, or Firm* — Hauptman Ham, LLP

(57) ABSTRACT

An integrated circuit (IC) device includes a transistor and a metal fuse structure including a metal fuse electrically connected to the transistor, and a first metal line in parallel with the metal fuse and adjacent to a first portion of the metal fuse in a first direction. The first portion has a first width, and the metal fuse includes a second portion having a second width larger than the first width, and a first contour between the first and second portions and aligned with a first end of the first metal line.

20 Claims, 12 Drawing Sheets

(56) References Cited

U.S. PATENT DOCUMENTS

| | | | |
|---|---|---|---|
| 2015/0022310 A1* | 1/2015 | Gratz | H01H 85/30 |
| | | | 337/290 |
| 2015/0067620 A1* | 3/2015 | Wu | G06F 30/30 |
| | | | 716/53 |
| 2015/0278429 A1 | 10/2015 | Chang | |
| 2019/0371801 A1* | 12/2019 | Chang | H01L 23/5252 |
| 2021/0020645 A1 | 1/2021 | Chang et al. | |
| 2021/0125678 A1* | 4/2021 | Cho | G11C 17/18 |

FOREIGN PATENT DOCUMENTS

| | | |
|---|---|---|
| TW | 201805950 | 2/2018 |
| TW | 202005045 | 1/2020 |

\* cited by examiner

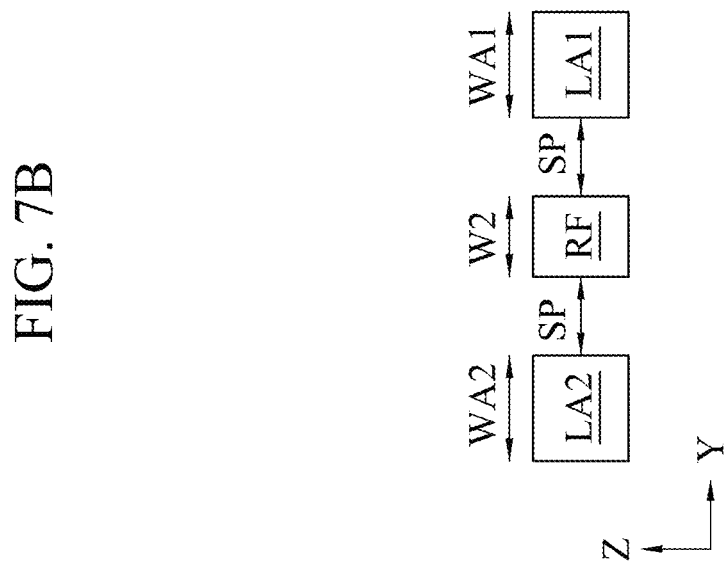
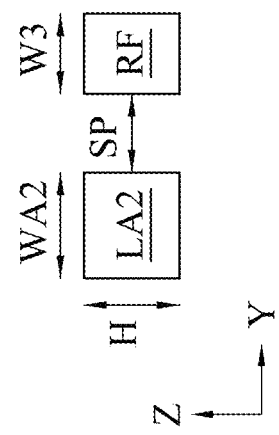
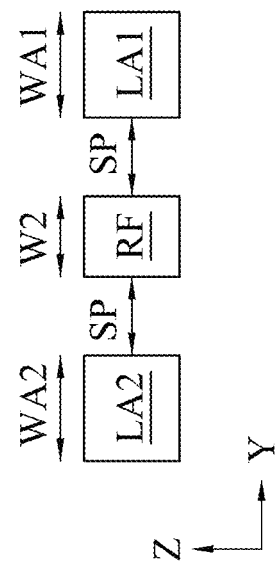
FIG. 7A
FIG. 7B
FIG. 7C
FIG. 7D

900

910 — Construct a metal fuse bit transistor on a semiconductor substrate

920 — Form a first spacer based on a first mask having a first pattern corresponding to a first metal line in a first metal layer extending in a first direction 930 — Form a second mask having a second pattern corresponding to a second metal line in the first metal layer, the second metal line extending in the first direction and overlapping the first spacer 940 — Form the first and second metal lines in the first metal layer based on the first and second patterns 950 — Construct an electrical connection between a first end of the second metal line and a S/D terminal of the metal fuse bit transistor 960 — Construct an electrical connection between a second end of the second metal line and a signal line

1010 Define a transistor in an IC layout diagram

1020 Position a first metal region in a first pattern of a multiple patterning process, the first metal region extending in a first direction in a first metal layer 1030 Position a second metal region in a second pattern of the multiple patterning process, the second metal region extending in the first direction adjacent to the first metal region in the first metal layer 1040 Define electrical connections to each end of the second metal region 1050 Store the IC layout diagram in a storage device 1060 Place the IC layout diagram in an IC layout diagram of a bit cell array 1070 Fabricate a semiconductor mask or component based on the IC layout diagram 1080 Perform one or more manufacturing operations based on the IC layout diagram

FIG. 10

MULTIPLE PATTERN METAL FUSE DEVICE, LAYOUT, AND METHOD

PRIORITY CLAIM

The present application claims the priority of U.S. Provisional Application No. 63/214,473, filed Jun. 24, 2021, which is incorporated herein by reference in its entirety.

BACKGROUND

Integrated circuits (ICs) sometimes include one-time-programmable (OTP) memory elements to provide non-volatile memory (NVM) in which data is not lost when the IC is powered off. OTP memory is a type of NVM that permits data to be written once to memory. Once the memory has been programmed, it retains its value upon loss of power.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 7A-7D are diagrams of IC structures, in accordance with some embodiments.

FIG. 9 is a flowchart of a method of manufacturing an IC device, in accordance with some embodiments.

FIG. 10 is a flowchart of a method of generating an IC layout diagram, in accordance with some embodiments.

DETAILED DESCRIPTION

Figure 1A:
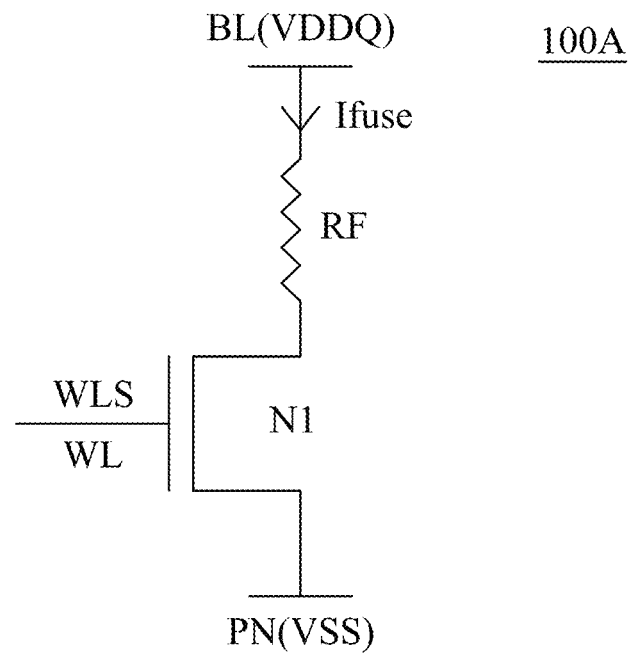
FIGS. 1A and 1B are schematic diagrams of IC devices, in accordance with some embodiments.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, an IC device based on an IC layout diagram includes a programmable metal fuse bit in which a metal fuse includes a first portion having a first width, a second portion having a second width smaller than the first width, and a contour between the first and second portions. The contour is aligned with an end of a metal line parallel to the metal fuse and adjacent to the second portion. The metal fuse and metal line correspond to separate patterns of a multiple patterning process, e.g., a double-patterning process such as a self-aligned double-patterning (SALE2) process, whereby the contour is based on a spacer of the metal line. In some embodiments, the programmable metal fuse bit includes one or more additional metal lines parallel to the metal fuse and adjacent to one or more additional portions, e.g., a second metal line adjacent to a third portion overlapping the second portion, the overlapping second and third portions corresponding to a bottleneck feature having a third width smaller than the first and second widths.

By including the metal fuse having the second and/or third width smaller than the first width, the programmable metal fuse bit is capable of achieving a current density suitable for a programming operation based on a smaller current than in approaches in which a metal fuse does not include one or more widths smaller than the first width, thereby allowing smaller transistor sizes and lower operating voltages and improving programming reliability.

Figure 1B:
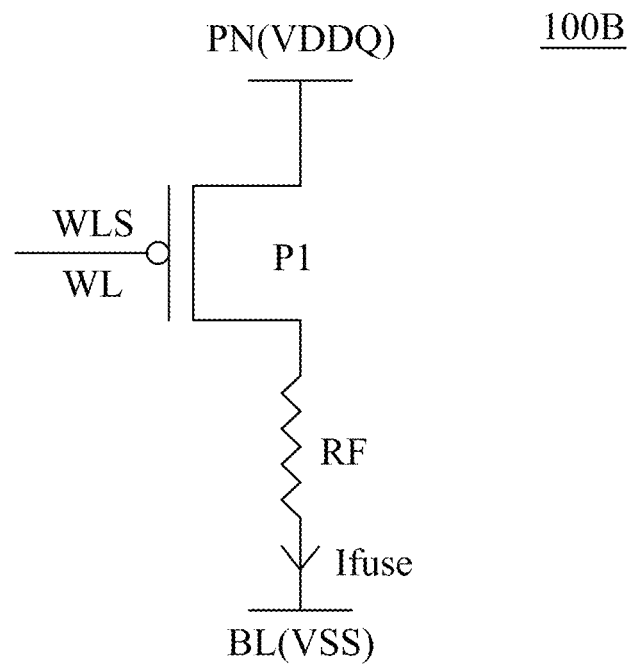

FIGS. 1A and 1B are schematic diagrams of respective IC devices 100A and 100B, in accordance with some embodiments. Each of IC devices 100A and 100B, also referred to as a programmable metal fuse bit 100A or 100B in some embodiments, includes a metal fuse RF coupled between a program node PN and a bit line BL. Metal fuse RF is configured in accordance with the IC layout diagram and IC structure embodiments discussed below with respect to FIGS. 2A-7D.

In the embodiment depicted in FIG. 1A, IC device 100A includes bit line BL configured to carry a voltage VDDQ and an n-type metal-oxide semiconductor (NMOS) transistor N1 coupled between metal fuse RF and program node PN configured to carry a reference voltage VSS. Transistor N1 includes a gate configured to receive a signal WLS on a signal line WL, is coupled in series with metal fuse RF between bit line BL and program node PN, and is referred to as program NMOS transistor N1 in some embodiments. In the embodiment depicted in FIG. 1A, a source/drain (S/D) terminal of transistor N1 is electrically connected to metal fuse RF and a S/D terminal of transistor N1 is electrically connected to program node PN.

In the embodiment depicted in FIG. 1B, IC device 100B includes bit line BL configured to carry reference voltage VSS and a p-type metal-oxide semiconductor (PMOS) transistor P1 coupled between metal fuse RF and program node PN configured to carry voltage VDDQ. Transistor P1 includes a gate configured to receive signal WLS on signal line WL, is coupled in series with metal fuse RF between program node PN and bit line BL, and is referred to as program PMOS transistor P1 in some embodiments. In the embodiment depicted in FIG. 1B, an S/D terminal of transistor P1 is electrically connected to metal fuse RF and a S/D terminal of transistor P1 is electrically connected to program node PN.

In various embodiments, transistor N1 or P1 is a standard threshold voltage (SVT) device, a low threshold voltage (LVT) device, a high voltage threshold (HVT) device, a high voltage (HV) device, an input-output (IO) device, or another suitable device capable of selectively coupling metal fuse RF to program node PN responsive to signal WLS.

Two or more circuit elements are considered to be coupled based on a direct electrical connection, a resistive or reactive electrical connection, or an electrical connection that includes one or more additional circuit elements and is thereby capable of being controlled, e.g., made resistive or open by a transistor or other switching device.

In some embodiments, IC device 100A or 100B is some or all of a bit cell of a plurality of bit cells in which each bit cell is coupled with bit line BL. In some embodiments, bit line BL is one bit line of a plurality of bit lines. In some embodiments, IC device 100A or 100B is some or all of a bit cell of a plurality of bit cells of a memory array, e.g., a memory array 800 discussed below with respect to FIG. 8. In some embodiments, signal line WL is a word line of a memory circuit and signal WLS is a word line signal configured to select a bit cell including IC device 100A or 100B in a programming and/or read operation. In some embodiments, a memory circuit includes one or more sense amplifiers (not shown) configured to determine a programmed state of IC device 100A or 100B in a read operation.

Each of IC devices 100A and 100B is thereby configured to, in operation, receive voltage VDDQ on one of bit line BL or program node PN, and reference voltage VSS on the other of bit line BL or program node PN. Voltage VDDQ is controllable to have predetermined program and read magnitudes relative to reference voltage VSS configured to cause a current Ifuse to flow through metal fuse RF in the corresponding programming and read operations.

Metal fuse RF, also referred to as a metal line RF in some embodiments, is an IC structure capable of being sustainably altered, e.g., fused to a high resistance or open circuit state, and thereby programmed, by current Ifuse having a magnitude that exceeds a predetermined current level. In the programming operation, the predetermined current level corresponds to a current density capable of producing a destructive temperature through self-heating such that metal fuse RF has a small resistance in a programmed state relative to the high resistance or open circuit state in a non-programmed state. In addition to the predetermined current level, a current density level capable of being destructive is a function of the dimensions of metal fuse RF as discussed below with respect to FIGS. 2A-7D.

In some embodiments, voltage VDDQ relative to reference voltage VSS, and therefore current Ifuse, have positive polarities in one or both of the programming or read operations. In some embodiments, voltage VDDQ relative to reference voltage VSS, and therefore current Ifuse, have negative polarities in one or both of the programming or read operations.

The read magnitude of voltage VDDQ generates current Ifuse having a relatively low current level, e.g., near 0 amperes (A), based on the sustainably altered state, when IC device 100A or 100B is in the programmed state, and having a relatively high current level, e.g., greater than 1 microampere (μA), based on the low resistance path of metal fuse RF when IC device 100A or 100B is in the non-programmed state.

FIGS. 2A-6A and 2B-6B are diagrams of respective IC layout diagrams 200A-600A and corresponding IC structures 200B-600B, in accordance with some embodiments, and FIGS. 7A-7D are cross-sectional diagrams corresponding to IC structures 200B-600B, in accordance with some embodiments. Each of IC layout diagrams 200A-600A is one or more electronic files generated by an IC layout generation system, e.g., an IC layout diagram generation system 1100 discussed below with respect to FIG. 11, in accordance with an IC layout generation method, e.g., a method 1000 discussed below with respect to FIG. 10.

Each of IC layout diagrams 200A-600A is usable in a manufacturing method, e.g., a method 900 discussed below with respect to FIG. 9, to construct the corresponding IC structure 200B-600B in accordance with the cross-sections depicted in FIGS. 7A-7D. In some embodiments, the manufacturing method is performed using an IC manufacturing system 1200 and an IC manufacturing flow associated therewith as discussed below with respect to FIG. 12.

As discussed below, each of IC structures 200B-600B includes metal fuse RF discussed above with respect to FIGS. 1A and 1B, and each of IC layout diagrams 200A-600A includes a metal region RFR corresponding to metal fuse RF. Each of FIGS. 2A-6B includes X and Y directions and each of FIGS. 7A-7D includes the Y direction and a Z direction. FIGS. 2A-6A depict various combinations of metal regions LAR1-LAR3 in parallel with and adjacent to metal region RFR, and FIGS. 2B-6B and 7A-7D depict corresponding combinations of metal lines LA1-LA3 in parallel with and adjacent to metal fuse RF.

Each of the figures herein, e.g., FIGS. 2A-7D, is simplified for the purpose of illustration. The figures are views of IC structures, devices, and layout diagrams with various features included and excluded to facilitate the discussion below. In various embodiments, in addition to the features depicted, e.g., in FIGS. 2A-7D, an IC structure, device and/or layout diagram includes one or more features corresponding to power distribution structures, metal interconnects, transistors, contacts, vias, gate structures or other transistor elements, isolation structures, or the like, e.g., features corresponding to IC device 100A or 100B discussed above with respect to FIGS. 1A and 1B and/or memory array 800 discussed below with respect to FIG. 8.

A metal region, e.g., metal region RFR or LAR1-LAR3, is a region in an IC layout diagram, e.g., IC layout diagram 200A-600A, capable of at least partially defining a metal segment, e.g., metal fuse RF or metal line LA1-LA3, in an IC structure manufactured based on the IC layout diagram, e.g., IC structure 200B-600B. The corresponding metal segment includes one or more conductive materials, e.g., one or more of copper (Cu), silver (Ag), tungsten (W), titanium (Ti), nickel (Ni), tin (Sn), aluminum (Al) or another metal or material, e.g., polysilicon, suitable for providing a low resistance electrical connection between IC structure elements, i.e., a resistance level below a predetermined threshold corresponding to one or more tolerance levels of a resistance-based effect on circuit performance.

Metal regions RFR and LAR1-LAR3 at least partially define corresponding metal fuse RF and metal lines LA1-LA3 in a given metal layer of the IC device. In various embodiments, the given metal layer is a first metal layer, a second metal layer, or a metal layer above the second metal layer.

Metal regions LAR1-LAR3 correspond to a first pattern of a multiple patterning process, and metal region RFR corresponds to a second pattern of the multiple patterning process, as further discussed below with respect to FIGS. 9 and 10. In the embodiments discussed below, each of metal lines LA1-LA3 is formed based on the corresponding metal region LAR1-LAR3 and thereby separated from metal fuse RF by one or more dielectric layers (not shown) having a thickness SP and conforming to a shape of the metal line LA1-LA3.

A dielectric layer is a volume including one or more insulating materials, e.g., silicon dioxide and/or one or more other suitable material such as a low-k material having a k value less than 3.8 or a high-k material having a k value greater than 3.8, suitable for providing a high electrical resistance between IC structure elements, i.e., a resistance level above a predetermined threshold corresponding to one or more tolerance levels of a resistance-based effect on circuit performance.

As depicted in FIGS. 2A-6B, each of metal regions RFR and LAR1-LAR3 and the corresponding metal fuse RF and metal line LA1-LA3 extends in the X direction, and metal region RFR has a width LW0 in the Y direction. In some embodiments, width LW0 corresponds to a critical dimension, e.g., a minimum feature size of the first pattern of the multiple patterning process.

Figure 8:
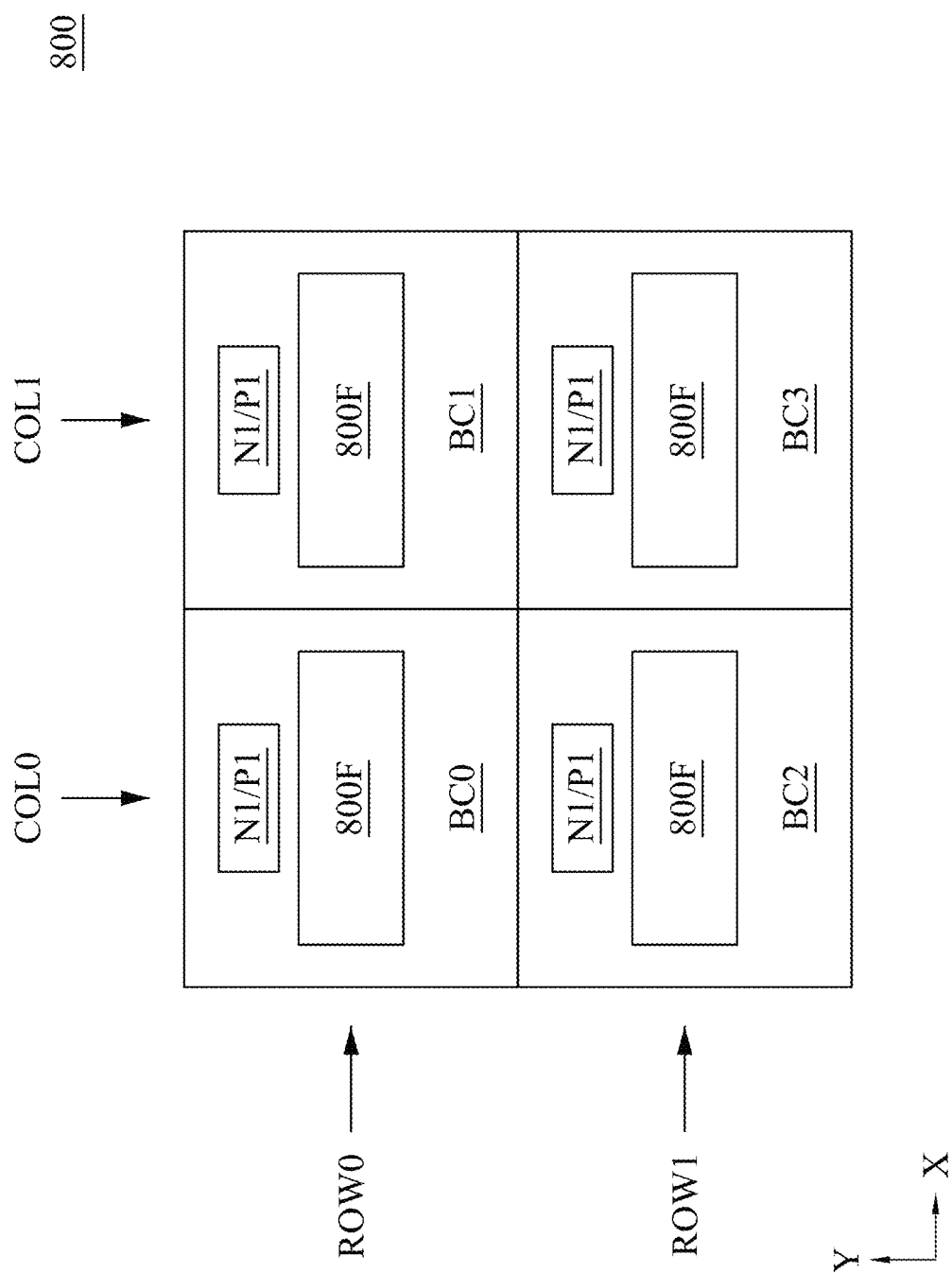
FIG. 8 is a diagram of a memory array, in accordance with some embodiments.

In addition to the features depicted in FIGS. 2A-6A, each of IC layout diagrams 200A-600A includes one or more features (not shown), e.g., one or more via and/or metal regions overlapping metal region RFR, configured to define electrical connections to metal fuse RF, e.g., one or more corresponding via and/or metal structures, in the corresponding IC structure 200B-600B in accordance with an IC device, e.g., IC device 100A or 100B discussed above with respect to FIGS. 1A and 1B, and/or a memory array, e.g., memory array 800 discussed below with respect to FIG. 8.

In some embodiments, IC layout diagrams 200A-600A include metal regions LAR1-LAR3 configured to define corresponding metal lines LA1-LA3 electrically isolated from metal fuse RF, from each other, and from an entirety of other features of the IC device, e.g., by being entirely surrounded by one or more dielectric layers. In such embodiments, each of metal lines LA1-LA3 is thereby configured to have a floating voltage level in operation.

In the various embodiments discussed below, metal fuse RF includes ends RFE1 and RFE2, metal lines LA1-LA3 include ends E1-E6, and metal fuse RF includes contours C1-C6 corresponding to ends E1-E6. Ends E1-E6 are separated from the corresponding contours C1-C6 by the one or more dielectric layers having thickness SP such that contours C1-C6 are aligned with corresponding ends E1-E6. The various combinations of contours C1-C6 separate metal fuse RF into multiple portions, each portion having one of widths W0-W3 in the Y direction having an approximately constant value with respect to the X direction.

In the embodiments depicted in FIGS. 2B-6B, contours C1-C6 being aligned with corresponding ends E1-E6 includes contours C1-C6 and ends E1-E6 having shapes corresponding to portions of a circle perimeter, e.g., arcs, separated by thickness SP. In various embodiments, contours C1-C6 being aligned with corresponding ends E1-E6 includes contours C1-C6 and ends E1-E6 having other shapes, e.g., combinations of curves and/or diagonal lines, separated by thickness SP.

In the embodiments depicted in FIGS. 2B-6B, contours C1-C6 being aligned with corresponding ends E1-E6 includes each of contours C1-C6 and ends E1-E6 having same shapes. In various embodiments, contours C1-C6 being aligned with corresponding ends E1-E6 includes one or more of a contour C1-C6 and corresponding end E1-E6 having a shape different from one or more shapes of one or more other ones of contours C1-C6 and corresponding ends E1-E6.

Figure 2A:
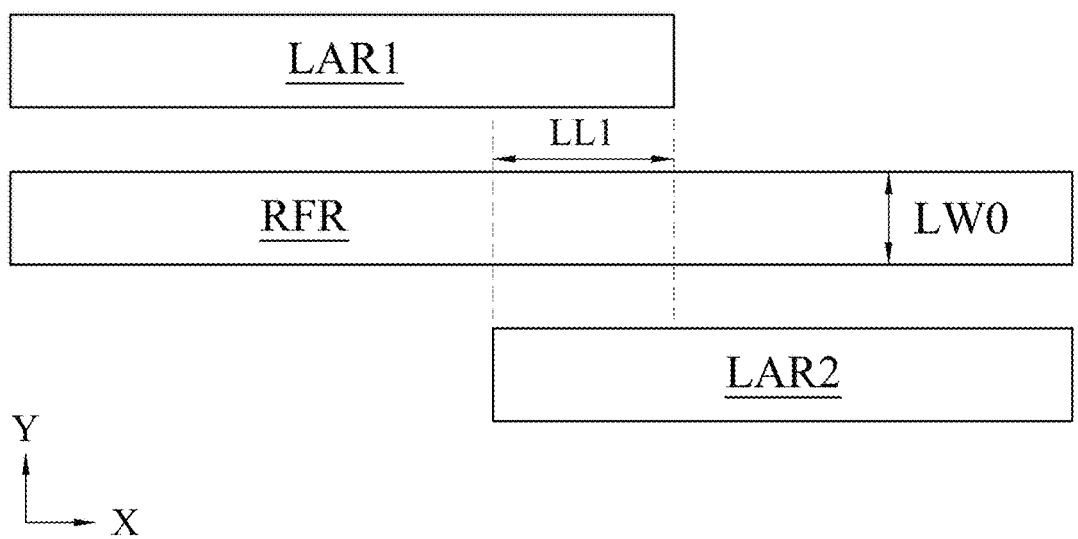
FIGS. 2A and 2B are diagrams of an IC layout diagram and corresponding IC structure, in accordance with some embodiments.

In the embodiment depicted in FIG. 2A, IC layout diagram 200A includes metal region LAR1 in parallel with and adjacent to metal region RFR in the positive Y direction, and metal region LAR2 in parallel with and adjacent to metal region RFR in the negative Y direction. Entireties of each of metal regions LAR1 and LAR2 are coextensive with metal region RFR in the X direction, and metal regions LAR1 and LAR2 are coextensive with each other in the X direction over a distance LL1. An entirety of metal region RFR is coextensive with at least one of metal regions LAR1 or LAR2 in the X direction.

Figure 2B:
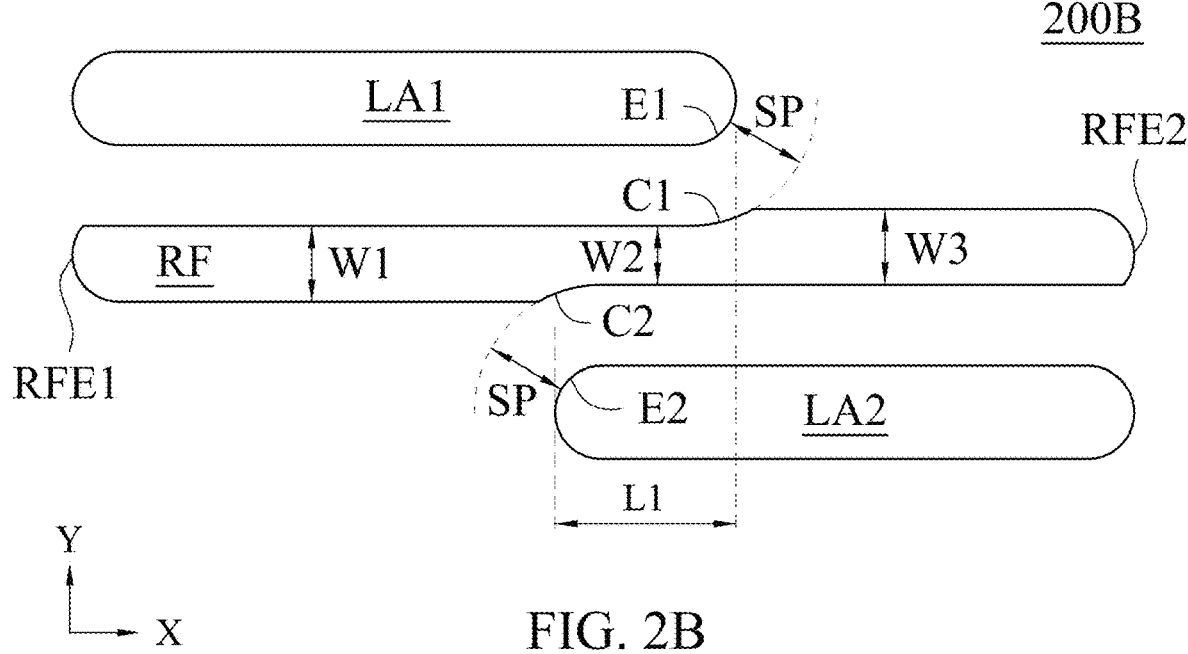

As depicted in FIG. 2B, the corresponding IC structure 200B includes metal line LA1 in parallel with and adjacent to metal fuse RF in the positive Y direction, and metal line LA2 in parallel with and adjacent to metal fuse RF in the negative Y direction. Entireties of each of metal lines LA1 and LA2 are coextensive with metal fuse RF in the X direction, and metal lines LA1 and LA2 are coextensive with each other in the X direction over a distance L1. An entirety of metal fuse RF is coextensive with at least one of metal lines LA1 or LA2 in the X direction.

Contour C1 is aligned with end E1 of metal line LA1, contour C2 is aligned with end E2 of metal line LA2, and each of ends E1 and E2 and contours C1 and C2 are separated from each other in the X direction by distance L1. A portion of metal fuse RF extending in the negative X direction from contour C2 to end RFE1 has width W1, a portion of metal fuse RF between contours C2 and C1 has width W2, and a portion of metal fuse RF extending in the positive X direction from contour C1 to end RFE2 has width W3.

Width W1 corresponds to the portion of metal fuse RF being coextensive solely with metal line LA1, width W2 corresponds to the portion of metal fuse RF being coextensive with both of metal lines LA1 and LA2, and width W3 corresponds to the portion of metal fuse RF being coextensive solely with metal line LA2. Width W2 is smaller than each of widths W1 and W3. In the embodiments depicted in the various figures, e.g., FIG. 2B, widths W1 and W3 are approximately equal. In some embodiments, width W1 is larger or smaller than width W3.

Figure 3A:
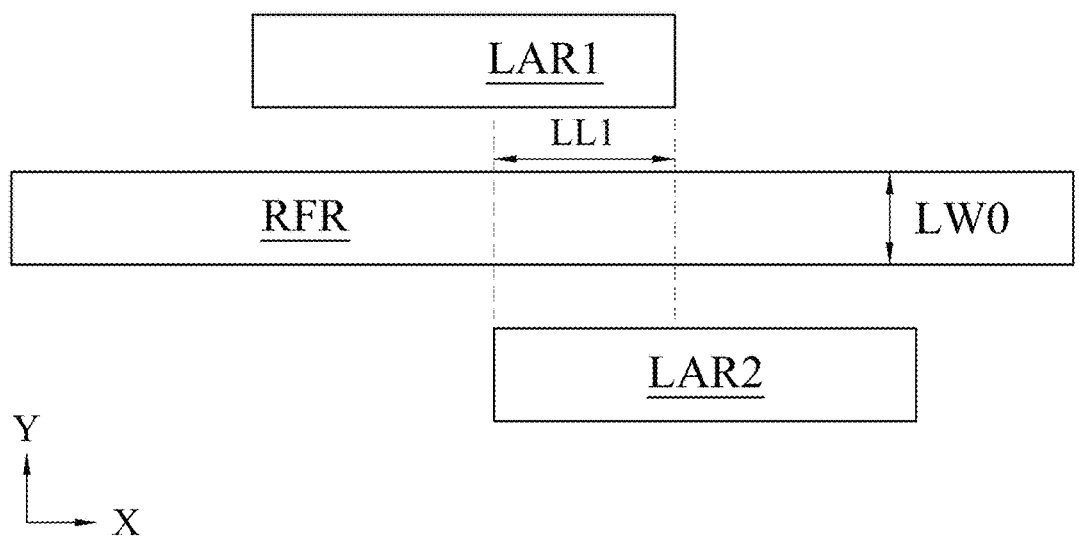
FIGS. 3A and 3B are diagrams of an IC layout diagram and corresponding IC structure, in accordance with some embodiments.

In the embodiment depicted in FIG. 3A, IC layout diagram 300A includes metal regions LAR1, LAR2, and RFR arranged as in IC layout diagram 200A except that metal region RFR includes portions that are free from being coextensive with at least one of metal regions LAR1 or LAR2 in the X direction. Accordingly, in addition to the features discussed above with respect to FIG. 2B, the corresponding IC structure 300B depicted in FIG. 3B includes metal fuse RF including portions that are free from being coextensive with at least one of metal lines LA1 or LA2 in the X direction.

In addition to contours C1 and C2, metal fuse RF of IC structure 300B thereby includes contour C3 aligned with end E3 of metal line LA1 and contour C4 aligned with end E4 of metal line LA2. Each of a portion of metal fuse RF extending in the negative X direction from contour C3 to end RFE1 and a portion of metal fuse RF extending in the positive X direction from contour C4 to end RFE2 has width W0.

Because width W0 corresponds to the portions of metal fuse RF that are free from being coextensive with at least one of metal lines LA1 or LA2 in the X direction, width W0 is at least partially defined by width LW0 of metal region RFR.

Figure 3B:
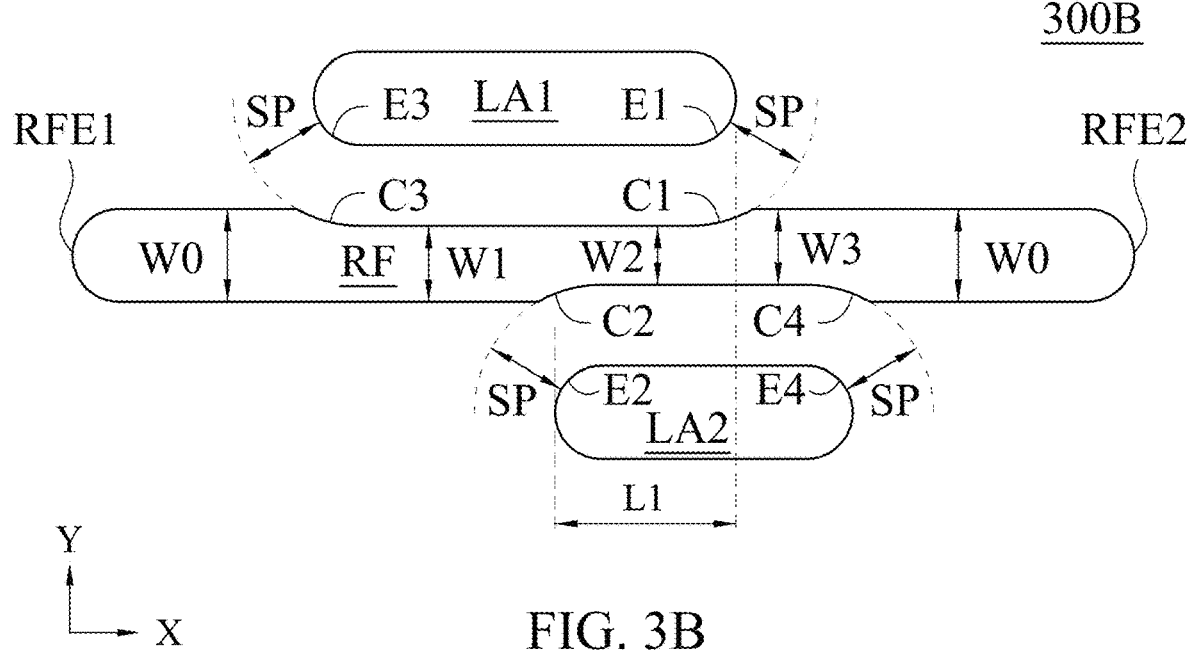

In the embodiment depicted in FIG. 3B, metal fuse RF of IC structure 300B includes two portions having width W0. In some embodiments, metal fuse RF includes a single one of the portion extending in the negative X direction from contour C3 to end RFE1 or the portion extending in the positive X direction from contour C4 to end RFE2 having width W0.

In some embodiments, the portion of metal fuse RF having width W2 is referred to as a bottleneck shape, and one or more of IC layout diagrams 200A or 300A or IC structures 200B or 300B is referred to as a single bottleneck metal fuse implementation.

Figure 4A:
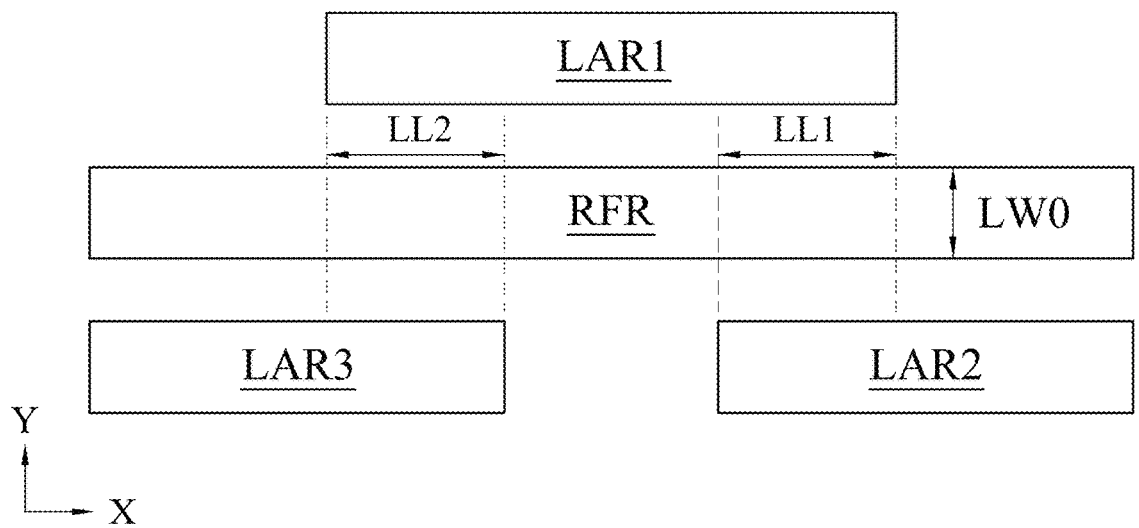
FIGS. 4A and 4B are diagrams of an IC layout diagram and corresponding IC structure, in accordance with some embodiments.

In the embodiment depicted in FIG. 4A, IC layout diagram 400A includes metal regions LAR1 and RFR arranged as in IC layout diagram 300A, and metal regions RFR and LAR2 arranged as in IC layout diagram 200A. IC layout diagram 400A also includes metal region LAR3 in parallel with and adjacent to metal region RFR in the negative Y direction, metal regions LAR2 and LAR3 being aligned in the X direction. An entirety of metal region LAR3 is coextensive with metal region RFR in the X direction, and metal regions LAR1 and LAR3 are coextensive with each other in the X direction over a distance LL2. An entirety of metal region RFR is coextensive with at least one of metal regions LAR1, LAR2, or LAR3 in the X direction. In various embodiments, distance LL2 is less than, equal to, or greater than distance LL1.

Figure 4B:
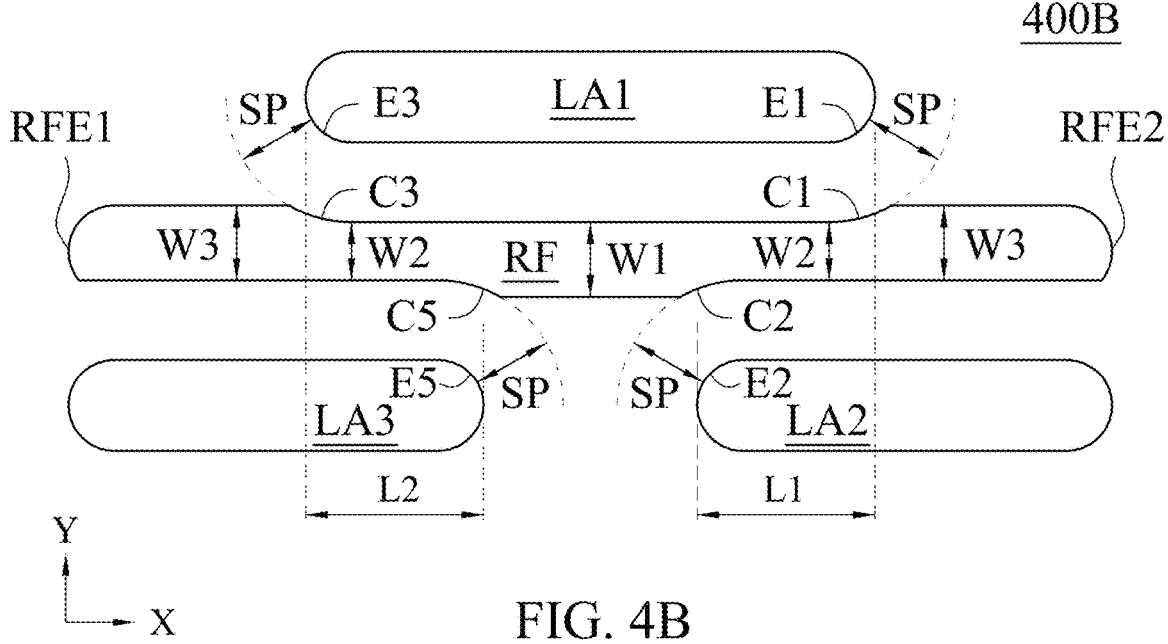

Accordingly, the corresponding IC structure 400B depicted in FIG. 4B includes the features associated with end E1 of metal line LA1 and end E2 of metal line LA2 discussed above with respect to FIGS. 2B and 3B, and also includes metal line LA3 in parallel with and adjacent to metal fuse RF in the negative Y direction and aligned with metal line LA2 in the X direction. An entirety of metal line LA3 is coextensive with metal fuse RF in the X direction, and metal lines LA1 and LA3 are coextensive with each other in the X direction over a distance L2. An entirety of metal fuse RF is coextensive with at least one of metal lines LA1, LA2, or LA3 in the X direction.

In addition to contours C1 and C2, metal fuse RF of IC structure 400B thereby includes contour C5 aligned with end E5 of metal line LA3 and contour C3 aligned with metal line LA3 in the Y direction.

In addition to the portions associated with contours C1 and C2 discussed above with respect to IC structure 300B, metal fuse RF of IC structure 400B includes a portion extending in the negative X direction from contour C3 to end RFE1 having width W3 and a portion between contours C3 and C5 having width W2. Metal fuse RF of IC structure 400B thereby includes a first portion between contours C3 and C5 having width W2 and a second portion between contours C1 and C2 having width W2, with each of ends E3 and E5 and contours C3 and C5 separated from each other in the X direction by distance L2.

Figure 5A:
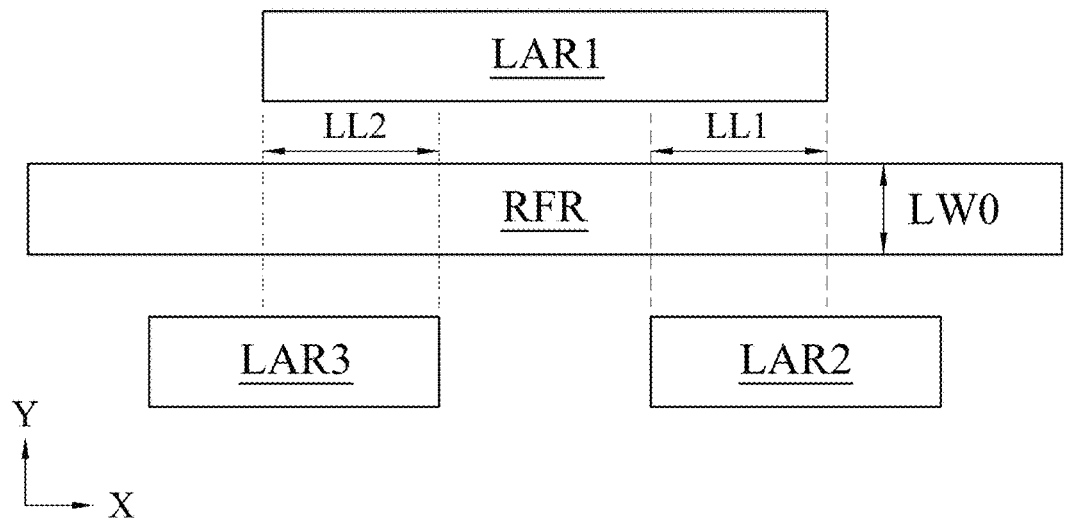
FIGS. 5A and 5B are diagrams of an IC layout diagram and corresponding IC structure, in accordance with some embodiments.

In the embodiment depicted in FIG. 5A, IC layout diagram 500A includes metal regions LAR1-LAR3 and RFR arranged as in IC layout diagram 400A except that metal region RFR includes portions that are free from being coextensive with at least one of metal regions LAR1, LAR2, or LAR3 in the X direction. Accordingly, in addition to the features discussed above with respect to FIG. 4B, the corresponding IC structure 500B depicted in FIG. 5B includes metal fuse RF including portions that are free from being coextensive with at least one of metal lines LA1, LA2, or LA3 in the X direction.

In addition to contours C1-C5, metal fuse RF of IC structure 500B thereby includes contour C6 aligned with end E6 of metal line LA3. Each of a portion of metal fuse RF extending in the negative X direction from contour C6 to end RFE1 and the portion of metal fuse RF extending in the positive X direction from contour C4 to end RFE2 has width W0.

Figure 5B:
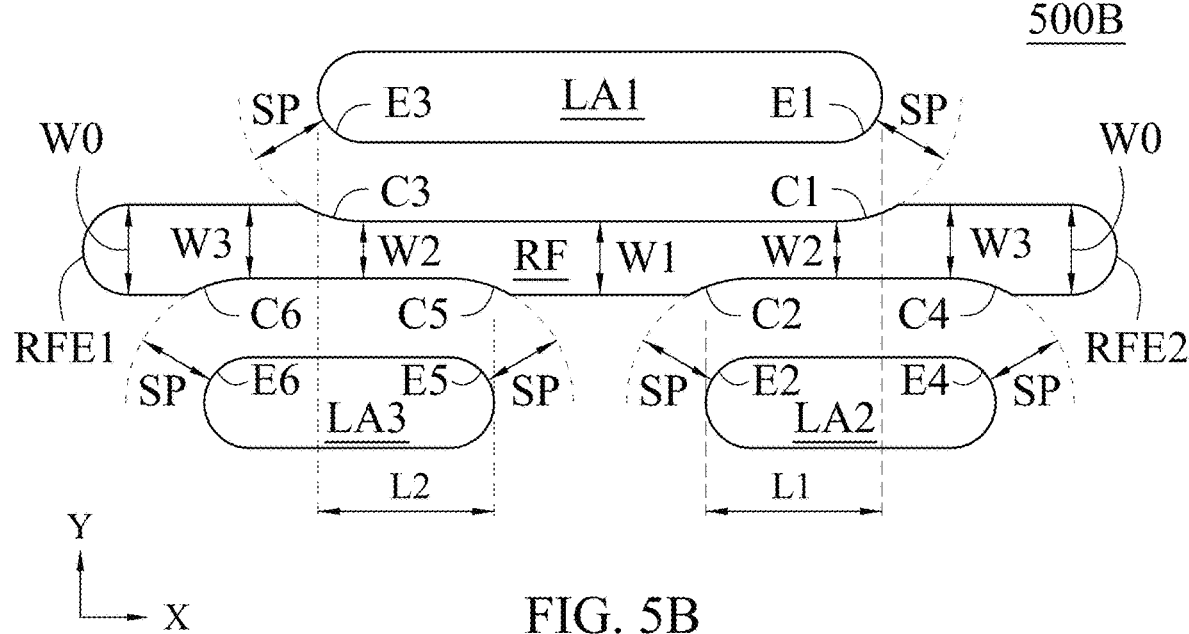

In the embodiment depicted in FIG. 5B, metal fuse RF of IC structure 500B includes two portions having width W0. In some embodiments, metal fuse RF includes a single one of the portion extending in the negative X direction from contour C6 to end RFE1 or the portion extending in the positive X direction from contour C4 to end RFE2 having width W0.

In some embodiments, one or more of IC layout diagrams 400A or 500A or IC structures 400B or 500B is referred to as a double bottleneck metal fuse implementation.

Figure 6A:
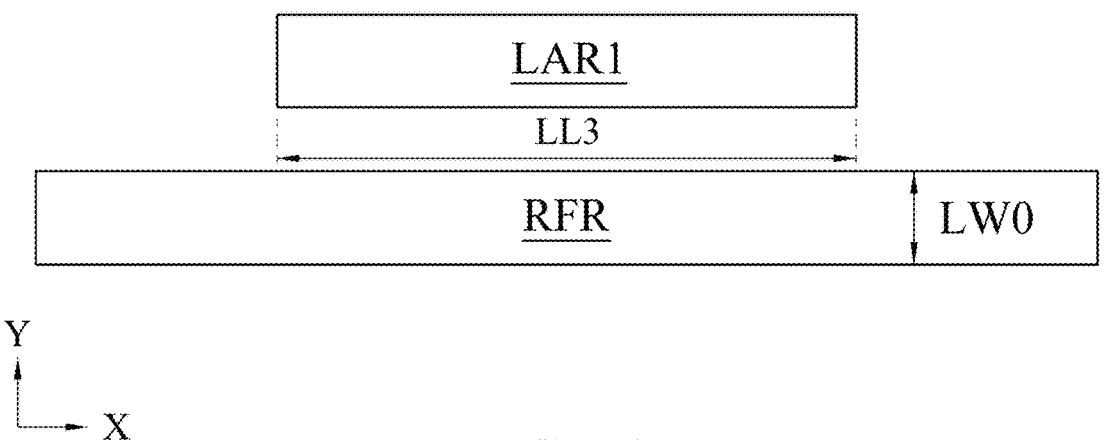
FIGS. 6A and 6B are diagrams of an IC layout diagram and corresponding IC structure, in accordance with some embodiments.

In the embodiment depicted in FIG. 6A, IC layout diagram 600A includes metal regions LAR1 and RFR arranged as in IC layout diagram 300A and is free from including a metal region in parallel with and adjacent to metal region RFR in the negative Y direction. Metal region LAR1 extends a distance LL3 in the X direction and the entirety of metal region LAR3 is coextensive with metal region RFR in the X direction.

Figure 6B:
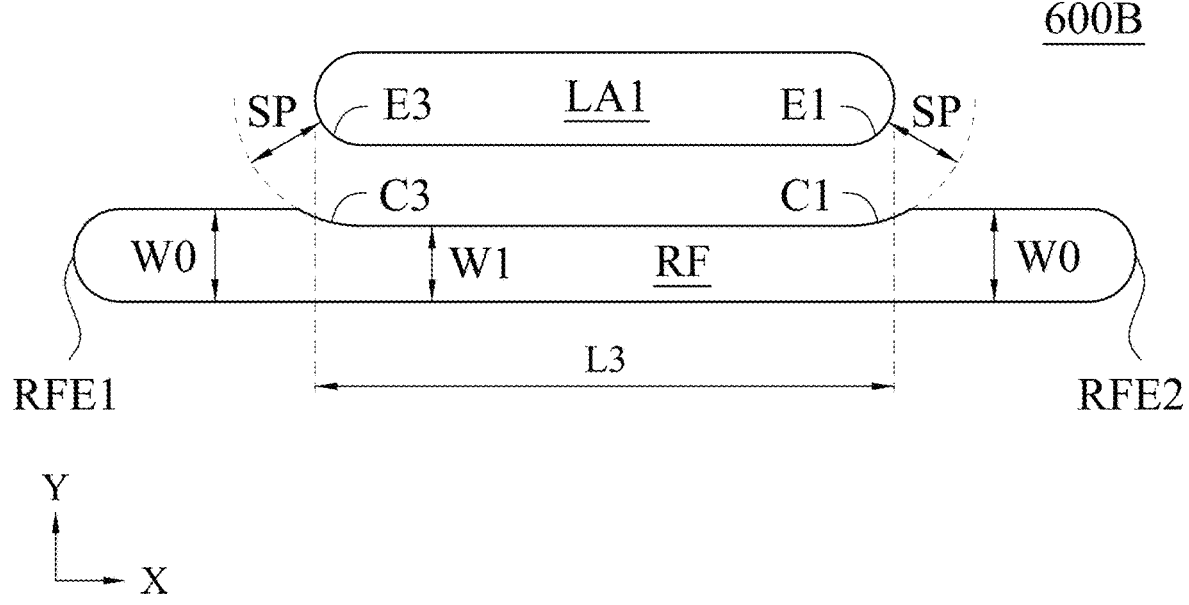

As depicted in FIG. 6B, the corresponding IC structure 600B includes metal line LA1 in parallel with and adjacent to metal fuse RF in the positive Y direction. The entirety of metal line LA1 is coextensive with metal fuse RF in the X direction over a distance L3. In addition to a portion coextensive with metal line LA1 in the X direction, metal fuse RF includes two portions that are free from being coextensive with metal line LA1 in the X direction.

Metal fuse RF of IC structure 600B thereby includes a portion extending in the negative X direction from contour C3 to end RFE1 having width W0, a portion extending in the positive X direction from contour C1 to end RFE2 having width W0, and a portion between contours C1 and C3 having width W1 and extending over distance L3. Each of ends E1 and E3 of metal line LA1 and contours C1 and C3 of metal fuse RF are separated by distance L3.

Each of the embodiments depicted in FIGS. 2A/2B-6A/6B is a non-limiting example provided for the purpose of illustration. In each of the embodiments depicted in FIGS. 2B-6B, metal fuse RF includes at least one portion having a width, e.g., width W1 or W2, smaller than a width, e.g., width W0, W1, or W3, of one or more additional portions, the various portions being separated by one or more of contours C1-C6 aligned with corresponding ends E1-E6 of adjacent metal lines LA1-LA3.

In various embodiments, metal fuse RF includes one or more portions in addition to those depicted in FIGS. 2B-6B having widths smaller than one or more widths of other portions, the additional portions being separated by one or more additional contours aligned with one or more additional ends of one more additional metal lines. In some embodiments, metal fuse RF includes the one or more additional portions corresponding to some or all of one or more of IC layout diagrams 200A-600A arranged in a pattern, e.g., by being repeated and/or combined. In some embodiments, an IC layout diagram and/or IC structure including multiple portions having width(s) smaller than one or more widths of the additional portions is referred to as a multiple bottleneck metal fuse implementation.

In the various embodiments, distances L1-L3 of IC structures 200B-600B correspond to overlay regions in which adjacent metal lines LA1-LA3 define portions of metal fuse RF having widths W1-W3 smaller than one or more widths of adjacent portions of metal fuse RF. Because metal lines LA1-LA3 are at least partially defined by metal regions LAR1-LAR3, distances L1-L3 of IC structures 200B-600B are at least partially defined by corresponding distances LL1-LL3 of IC layout diagrams 200A-600A.

Because of manufacturing variations, features of IC structures 200B-600B at least partially defined by the corresponding features of IC layout diagrams 200A-600A have shape and/or dimension variations within manufacturing tolerances such that absolute and relative values, e.g., uniformity throughout a portion, are considered to be approximate, e.g., approximately the same.

FIGS. 7A-7D depict cross-sections of metal fuse RF corresponding to each of widths W0-W3 in accordance with the various embodiments discussed above. FIG. 7A depicts metal fuse RF having width W0 at a portion that is free from being coextensive with an adjacent metal line in the X direction; FIG. 7B depicts metal fuse RF having width W1 at a portion that is coextensive with metal line LA1 adjacent in the X direction and separated by thickness SP in the positive Y direction; FIG. 7C depicts metal fuse RF having width W3 at a portion that is coextensive with metal line LA2 adjacent in the X direction and separated by thickness SP in the negative Y direction; and FIG. 7D depicts metal fuse RF having width W2 at a portion that is coextensive with both of metal lines LA1 and LA2 adjacent in the X direction, separated from metal line LA1 by thickness SP in the positive Y direction, and separated from metal line LA2 by thickness SP in the negative Y direction.

As depicted in FIGS. 7A-7D, each of metal fuse RF and metal lines LA1 and LA2 has a height H in the Z direction. In various embodiments, height H corresponds to a thickness of the metal layer in which metal fuse RF and metal lines LA1 and LA2 are located.

For a given value of height H, cross-sectional areas of the portions of metal fuse RF are proportional to the corresponding widths W0-W3 such that current density is inversely proportional to widths W0-W3 for a given value of current Ifuse discussed above with respect to FIGS. 1A and 1B. Accordingly, for a given value of current Ifuse, both the current density and the resultant self-heating increase as values of widths W0-W3 decrease.

In some embodiments, widths W0-W3 have values ranging from 5 nanometers (nm) to 80 nm. In some embodiments, widths W0-W3 have values ranging from 10 nm to 40 nm.

For a given material composition of metal fuse RF, the portions defined by the various combinations of height H and widths W0-W3 have resistance values that increase as distances LL1-LL3 of IC layout diagrams 200A-600A and corresponding distances L1-L3 of IC structures 200B-600B increase. For a given value of current Ifuse, as the resistance values increase, both the self-heating and potential difference also increase such that a tradeoff exists between the ability to generate heat and the need for voltage overhead within the IC device, e.g., based on voltage VDDQ relative to reference voltage VSS as discussed above with respect to FIGS. 1A and 1B.

In some embodiments, distances LL1-LL3 and L1-L3 have values ranging from 2 nm to 200 nm. In some embodiments, distances LL1-LL3 and L1-L3 have values ranging from 5 nm to 100 nm.

Widths W0-W3 and contours C1-C6 have dimensions and shapes that are determined in part by values of one or more widths (not labeled) of metal lines LA1-LA3, one or more distances (not labeled) between metal fuse RF and metal lines LA1-LA3, and thickness SP. In some embodiments, shapes of ends E1-E6, and thereby shapes of contours C1-C6, vary with respect to values of the widths of metal lines LA1-LA3, the distances between metal fuse RF and metal lines LA1-LA3, and/or thickness SP, e.g., a radius of curvature of a contour C1-C6 increases as values of the widths of metal lines LA1-LA3, the distances between metal fuse RF and metal lines LA1-LA3, and/or thickness SP increase.

In some embodiments, the widths of metal lines LA1-LA3 have values ranging from 5 nm to 80 nm. In some embodiments, the widths of metal lines LA1-LA3 have values ranging from 10 nm to 40 nm. In some embodiments, the widths of metal lines LA1-LA3 have values ranging from 20 nm to 50 nm.

In some embodiments, the distances between metal fuse RF and metal lines LA1-LA3 have values ranging from 2 nm to 50 nm. In some embodiments, the distances between metal fuse RF and metal lines LA1-LA3 have values ranging from 5 nm to 30 nm.

In some embodiments, thickness SP has one or more values ranging from 2 nm to 50 nm. In some embodiments, thickness SP has one or more values ranging from 5 nm to 30 nm.

By each of the configurations discussed above, an IC device, e.g., IC device 100A or 100B, based on an IC layout diagram 200A-600A includes a programmable metal fuse bit in which metal fuse RF includes a first portion having a first width W0-W3, a second portion having a second width W1 or W2 smaller than the first width, and a contour C1-C6 between the first and second portions and aligned with an end E1-E6 of a metal line LA1-LA3. The IC device is thereby capable of achieving a current density suitable for a programming operation based on a smaller current than in approaches in which a metal fuse does not include one or more widths smaller than the first width, thereby allowing smaller transistor sizes and lower operating voltages and improving programming reliability.

In some embodiments, in operation, because contours C1-C6 correspond to discontinuities in edges of metal fuse RF between the various portions, current density distributions are concentrated near contours C1-C6 such that localized self-heating is increased relative to approaches in which metal fuses do not include contours C1-C6.

FIG. 8 is a diagram of memory array 800 including IC devices BC0-BC3 corresponding to instances of one of IC devices 100A or 100B, in accordance with some embodiments. The depiction of memory array 800 in FIG. 8 corresponds both to an IC layout diagram in which the instances of IC device 100A or 100B include one of IC layout diagrams 200A-600A and to an IC device in which the instances of IC device 100A or 100B include one of IC structures 200B-600B. In addition to memory array 800, FIG. 8 depicts the X and Y directions.

Memory array 800 includes rows ROW0 and ROW1 extending in the X direction; row ROW0 includes IC devices BC0 and BC1, and row ROW1 includes IC devices BC2 and BC3. IC devices BC0 and BC2 are included in a column COL0 extending in the Y direction and IC devices BC1 and BC3 are included in a column COL1 extending in the Y direction.

The embodiment depicted in FIG. 8 includes two rows ROW0 and ROW1 and two columns COL0 and COL1 including four instances of IC device 100A or 100B, i.e., IC devices BC0-BC3, for the purpose of illustration. In various embodiments, memory array 800 includes one or more rows in addition to rows ROW0 and ROW1 and/or one or more columns in addition to columns COL0 and COL1, each additional column and/or row including instances of IC device 100A or 100B.

As depicted in FIG. 8, each of IC devices BC0-BC3, also referred to as programmable metal fuse bits BC0-BC3 in some embodiments, includes either NMOS transistor N1 of IC device 100A or PMOS transistor P1 of IC device 100B, each discussed above with respect to FIGS. 1A and 1B, and an IC layout diagram/structure 800F corresponding to one or more of IC layout diagrams/structures 200A/200B-600A/600B discussed above with respect to FIGS. 2A-7D.

FIG. 8 is simplified for the purpose of illustration. In addition to the features depicted in FIG. 8, IC devices BC0-BC3 and memory array 800 include one or more additional features, e.g., instances of program node PN, bit line BL, and signal line WL, and one or more sense amplifiers, control circuits, etc., whereby memory array 800 is capable of performing programming and read operations as discussed above with respect to FIGS. 1A and 1B.

By the configuration discussed above, memory array 800 includes IC devices BC0-BC3, each of which includes one or more of IC layout diagrams/structures 200A/200B-600A/600B including metal line/fuse RFR/RF capable of realizing the benefits discussed above with respect to IC layout diagrams/structures 200A/200B-600A/600B. In some embodiments, by including metal line/fuse RFR/RF and corresponding transistors N1 or P1, memory array 800 has an area reduced by as much as 19% compared to approaches that do not include metal line/fuse RFR/RF.

FIG. 9 is a flowchart of a method 900 of manufacturing an IC device, in accordance with some embodiments. Method 900 is operable to form an IC device 200B-600B discussed above with respect to FIGS. 1A-7D and/or memory array 800 discussed above with respect to FIG. 8.

In some embodiments, the operations of method 900 are performed in the order depicted in FIG. 9. In some embodiments, the operations of method 900 are performed in an order other than the order of FIG. 9. In some embodiments, one or more additional operations are performed before, during, between, and/or after the operations of method 900.

Some or all of the operations of method 900 are performed as part of a multiple patterning process, e.g., a double-patterning process such as a self-aligned double-patterning (SALE2) process. In some embodiments, one or more operations of method 900 are a subset of operations of a method of forming an IC device including one or more memory arrays, e.g., a system on a chip (SOC). In some embodiments, performing some or all of the operations of method 900 includes performing one or more operations as discussed below with respect to IC manufacturing system 1200 and FIG. 12.

At operation 910, in some embodiments, a metal fuse bit transistor is constructed on a semiconductor substrate. Constructing the metal fuse bit transistor includes performing a plurality of manufacturing operations, e.g., one or more of a lithography, diffusion, deposition, etching, planarizing, or other operation suitable for building a gate structure adjacent to source and drain structures (S/D terminals) and overlying an active area of the semiconductor substrate.

Constructing the metal fuse bit transistor includes constructing electrical connections, e.g., via structures and/or contacts, to each of the gate structure and two S/D terminals. In various embodiments, constructing the metal fuse bit transistor includes constructing a planar transistor, a fin field-effect transistor (FinFET), a gate-all-around (GAA) transistor, or other IC device suitable for selectively providing a conduction path between the S/D terminals responsive to a signal received at the gate structure.

In some embodiments, constructing the metal fuse bit transistor includes constructing NMOS transistor N1 discussed above with respect to FIG. 1A or PMOS transistor P1 discussed above with respect to FIG. 1B.

In some embodiments, constructing the metal fuse bit transistor includes constructing a plurality of metal fuse bit transistors of a memory array, e.g., memory array 800 discussed above with respect to FIG. 8, the plurality of metal fuse bit transistors including the metal fuse bit transistor.

At operation 920, a first spacer is formed based on a first mask having a first pattern corresponding to a first metal line in a first metal layer extending in a first direction. Forming the first spacer includes forming a first mandrel corresponding to the first pattern and forming the first spacer on a side of the first mandrel. In some embodiments, forming the first spacer includes forming the first mask.

Forming a mask, e.g., the first mask, includes forming a lithographic mask including one or more layers of material that is patterned using photolithography. Photolithography includes forming a photoresist, selectively exposing the photoresist to light having a suitable wavelength, and developing the photoresist. The light is passed through a reticle, which defines the pattern of selective exposure. Developing removes a portion of the photoresist to leave a patterned photoresist. The portion removed can be either the portion that was exposed to the light or the portion that was not exposed according to whether the photoresist is a positive photoresist or a negative photoresist. In some embodiments, forming the mask includes forming one or more layers beneath the photoresist and patterned using the photoresist.

Forming the first mandrel includes performing one or more etching processes, e.g., a plasma etching process, whereby portions of a mandrel layer are removed in accordance with the first pattern. In some embodiments, forming the mandrel by removing the portions of the mandrel layer includes removing the portions of an organosilicate polymer layer, an amorphous silicon layer, or a layer including one or more other suitable materials.

Forming the first spacer includes performing one or more conformal deposition processes, e.g., an atomic layer deposition (ALD) or chemical vapor deposition (CVD) process, followed by one or more etching processes, by which a spacer material layer is formed on sides of the first mandrel. In some embodiments, preforming the deposition and etching processes includes depositing and etching the spacer material including one of SiN, SiON, $SiO_2$, SiC, SiOC, or another suitable material.

In some embodiments, forming the first spacer includes forming the first spacer having a lateral thickness equal to thickness SP discussed above with respect to FIGS. 2A-7D.

In some embodiments, the first mask having the first pattern corresponding to the first metal line includes the first pattern corresponding to metal region LAR1 and metal line LA1 discussed above with respect to FIGS. 2A-7D.

In some embodiments, the first pattern corresponding to the first metal line includes the first pattern corresponding to a plurality of metal lines including the first metal line, and forming the first spacer includes forming a corresponding plurality of mandrels including the first mandrel and forming a corresponding plurality of spacers including the first spacer. In some embodiments, the first pattern corresponds to two or more of metal regions LAR1-LAR3 and metal lines LA1-LA3 discussed above with respect to FIGS. 2A-7D, and forming the first spacer includes forming two or more spacers correspondingly.

At operation 930, in some embodiments, a second mask is formed having a second pattern corresponding to a second metal line in the first metal layer, the second metal line extending in the first direction and overlapping the first spacer. Forming the second mask is performed in the manner of forming the first mask discussed above with respect to operation 920.

In some embodiments, forming the second mask having the second pattern corresponding to the second metal line includes the second pattern corresponding to metal region RFR and metal fuse RF discussed above with respect to FIGS. 2A-7D.

In some embodiments, the second metal line overlapping the first spacer includes the second metal line overlapping the first spacer corresponding to metal line LA1 discussed above with respect to FIGS. 2A-7D. In some embodiments, the second metal line overlapping the first spacer includes the second metal line overlapping a plurality of spacers including the first spacer. In some embodiments, the second metal line overlapping the first spacer includes the second metal line overlapping two or more spacers corresponding to two or more of metal regions LAR1-LAR3 and metal lines LA1-LA3 discussed above with respect to FIGS. 2A-7D.

At operation 940, the first and second metal lines are formed in the first metal layer based on the first and second patterns. Forming the first and second metal lines includes performing an etching process and a deposition process by which the first and second metal lines are configured in accordance with the first and second masks, the first spacer, and additional spacers if present. Performing the deposition process includes depositing one or more conductive materials, e.g., one or more of Cu, Ag, W, Ti, Ni, Sn, Al or another metal or suitable material, e.g., polysilicon.

Forming the second metal line includes forming a first contour aligned with an end of the first metal line and the first spacer. In some embodiments, forming the second metal line includes forming a second contour aligned with an end of a third metal line and a second spacer. In some embodiments, forming the second metal line including the first contour includes forming metal fuse RF including one or more of contours C1-C6 discussed above with respect to FIGS. 2A-7D.

In some embodiments, forming the first and second metal lines includes forming the first metal line electrically isolated from the second metal line and from other IC device features. In some embodiments, forming the first and second metal lines includes forming one or more metal lines in addition to the first and second metal lines, the one or more additional metal lines being electrically isolated from each other and from the other IC device features.

At operation 950, an electrical connection is constructed between a first end of the second metal line and a S/D terminal of the metal fuse bit transistor. Constructing the electrical connection includes performing one or more etching processes and one or more deposition processes whereby one or more via structures and/or one or more metal segments are formed so as to provide a low resistance path from the first end of the second metal line to the S/D terminal of the metal fuse bit transistor.

In some embodiments, constructing the electrical connection includes constructing the electrical connection between a first one of ends RFE1 or RFE2 and a S/D terminal of transistor N1 or P1 discussed above with respect to FIGS. 1A-7D.

At operation 960, in some embodiments, an electrical connection is constructed between a second end of the second metal line and a signal line. Constructing the electrical connection includes performing one or more etching processes and one or more deposition processes whereby one or more via structures and/or one or more metal segments are formed so as to provide a low resistance path from the second end of the second metal line to the signal line of a memory array, e.g., memory array 800 discussed above with respect to FIG. 8.

In some embodiments, constructing the electrical connection includes constructing the electrical connection between a second one of ends RFE1 or RFE2 and bit line BL discussed above with respect to FIGS. 1A-7D.

By performing some or all of the operations of method 900, an IC device is manufactured including a programmable metal fuse bit in which the second metal line includes a first portion having a first width, a second portion having a second width smaller than the first width, and a contour between the first and second portions and aligned with an end of the first metal line, thereby obtaining the benefits discussed above with respect to IC devices 100A and 100B including IC structures 200B-600B.

FIG. 10 is a flowchart of a method 1000 of generating an IC layout diagram corresponding to an IC device, e.g., an IC layout diagram 200A-600A discussed above with respect to FIGS. 1A-7D and/or memory array 800 discussed above with respect to FIG. 8, in accordance with some embodiments.

In some embodiments, some or all of method 1000 is executed by a processor of a computer, e.g., a processor 1102 of an IC layout diagram generation system 1100, discussed below with respect to FIG. 11.

Some or all of the operations of method 1000 are capable of being performed as part of a design procedure performed in a design house, e.g., a design house 1220 discussed below with respect to FIG. 12.

In some embodiments, the operations of method 1000 are performed in the order depicted in FIG. 10. In some embodiments, the operations of method 1000 are performed simultaneously and/or in an order other than the order depicted in FIG. 10. In some embodiments, one or more operations are performed before, between, during, and/or after performing one or more operations of method 1000.

At operation 1010, in some embodiments, a transistor is defined in an IC layout diagram. In some embodiments, defining the transistor includes defining one of transistors N1 or P1 discussed above with respect to FIGS. 1A-8.

In some embodiments, the transistor is one transistor of a plurality of transistors of a memory array, and defining the transistor includes defining the plurality of transistors of the memory array, e.g., memory array 800 discussed above with respect to FIG. 8.

At operation 1020, a first metal region is positioned in a first pattern of a multiple patterning process, the first metal region extending in a first direction in a first metal layer. In some embodiments, the multiple patterning process is a double-patterning process such as a SALE2 process.

In some embodiments, positioning the first metal region includes positioning a plurality of metal regions including the first metal region in the first pattern. In some embodiments, positioning the first metal region includes positioning one or more of metal regions LAR1-LAR3 discussed above with respect to FIGS. 2A-7D.

At operation 1030, a second metal region is positioned in a second pattern of the multiple patterning process, the second metal region extending in the first direction adjacent to the first metal region in the first metal layer. Positioning the second metal region adjacent to the first metal region includes separating the first and second metal regions by a distance less than a spacer thickness, e.g., thickness SP discussed above with respect to FIGS. 2A-7D, of the multiple patterning process.

In some embodiments, positioning the second metal region adjacent to the first metal region includes positioning the second metal region adjacent to a plurality of metal regions in the first pattern, the plurality of metal regions including the first metal region. In some embodiments, positioning the second metal region includes positioning metal region RFR adjacent to one or more of metal regions LAR1-LAR3 discussed above with respect to FIGS. 2A-7D.

At operation 1040, in some embodiments, electrical connections to each end of the second metal region are defined. Defining the electrical connections includes defining one or more via regions and/or metal regions in one or more metal layers including or in addition to the first metal layer. Defining the electrical connections includes defining an electrical connection to the transistor defined in operation 1010 in some embodiments.

In some embodiments, defining the electrical connections includes defining electrical connections from ends RFE1 and RFE2 defined by metal region RFR to transistor N1 or P1 and bit line BL as discussed above with respect to FIGS. 1A-7D.

At operation 1050, in some embodiments, the IC layout diagram is stored in a storage device. In various embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes storing the IC layout diagram in IC design storage 1107 or over network 1114 of IC layout diagram generation system 1100, discussed below with respect to FIG. 11.

At operation 1060, in some embodiments, the IC layout diagram is placed in an IC layout diagram of a bit cell array. In various embodiments, placing the IC layout diagram in the IC layout diagram of the IC die includes rotating the IC layout diagram about one or more axes and/or shifting the IC layout diagram relative to one or more additional IC layout diagrams in one or more directions.

In some embodiments, placing the IC layout diagram in the IC layout diagram of the bit cell array includes placing the IC layout diagram in the IC layout diagram of memory array 800 discussed above with respect to FIG. 8.

At operation 1070, in some embodiments, at least one of one or more semiconductor masks, or at least one component in a layer of a semiconductor IC is fabricated based on the IC layout diagram. Fabricating one or more semiconductor masks or at least one component in a layer of a semiconductor IC is discussed below with respect to FIG. 12.

At operation 1080, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed below with respect to FIG. 12.

By executing some or all of the operations of method 1000, an IC layout diagram is generated corresponding to an IC device including a programmable metal fuse bit in which the second metal line includes a first portion having a first width, a second portion having a second width smaller than the first width, and a contour between the first and second portions and aligned with an end of the first metal line, thereby obtaining the benefits discussed above with respect to IC devices 100A and 100B including IC structures 200B-600B.

Figure 11:
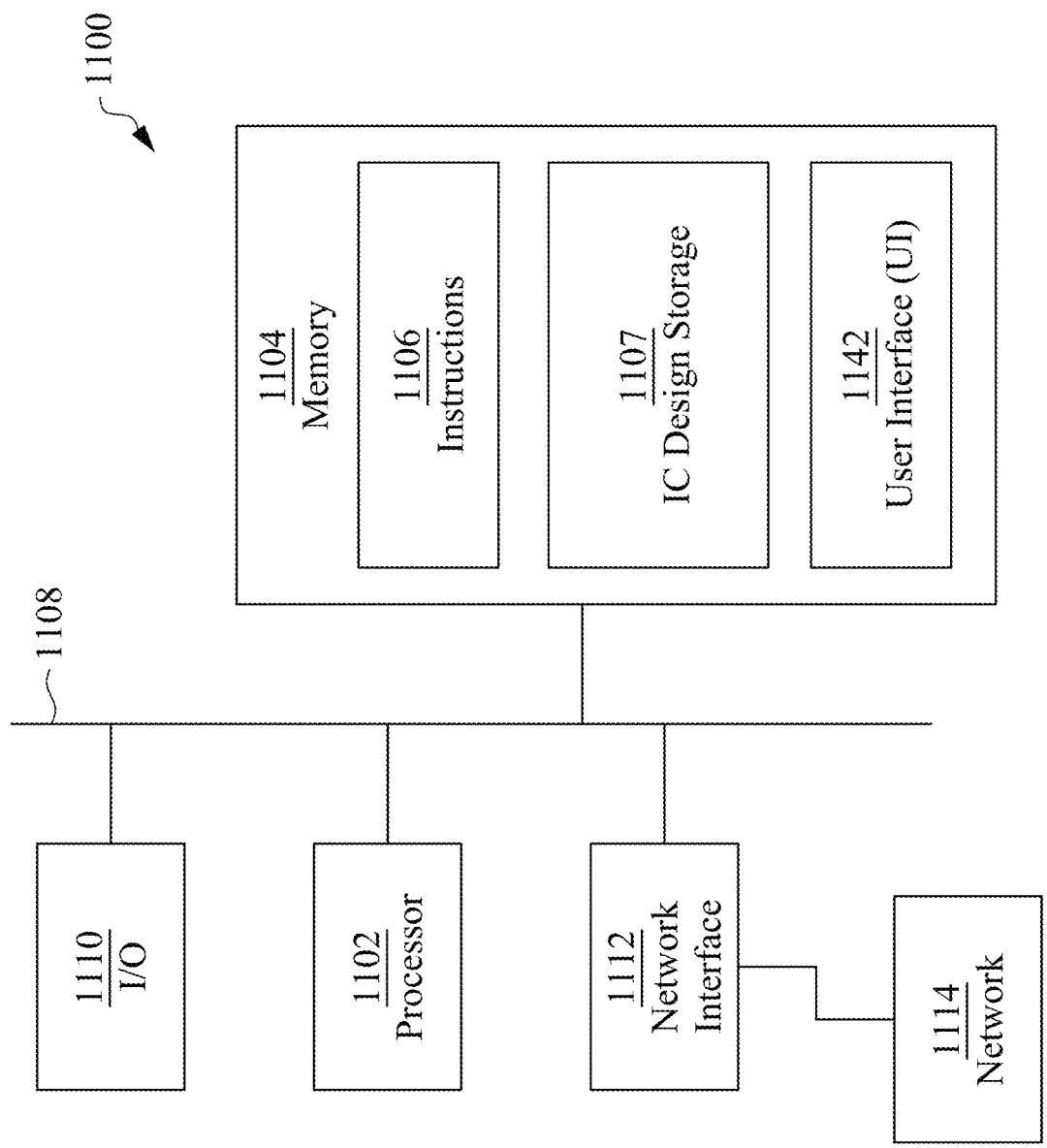
FIG. 11 is a block diagram of an IC layout diagram generation system, in accordance with some embodiments.

FIG. 11 is a block diagram of IC design system 1100, in accordance with some embodiments. Methods described herein of designing IC layout diagrams in accordance with one or more embodiments are implementable, for example, using IC design system 1100, in accordance with some embodiments. In some embodiments, IC design system 1100 is an APR system, includes an APR system, or is part of an APR system, usable for performing an APR method.

In some embodiments, IC design system 1100 is a general purpose computing device including a hardware processor 1102 and non-transitory, computer-readable storage medium 1104. Storage medium 1104, amongst other things, is encoded with, i.e., stores, computer program code 1106, i.e., a set of executable instructions. Execution of instructions 1106 by hardware processor 1102 represents (at least in part) an EDA tool which implements a portion or all of a method, e.g., method 700 of generating an IC layout diagram described above (hereinafter, the noted processes and/or methods).

Processor 1102 is electrically coupled to computer-readable storage medium 1104 via a bus 1108. Processor 1102 is also electrically coupled to an I/O interface 1110 by bus 1108. Network interface 1112 is also electrically connected to processor 1102 via bus 1108. Network interface 1112 is connected to a network 1114, so that processor 1102 and computer-readable storage medium 1104 are capable of connecting to external elements via network 1114. Processor 1102 is configured to execute computer program code 1106 encoded in computer-readable storage medium 1104 in order to cause IC design system 1100 to be usable for performing a portion or all of the noted processes and/or methods. In one or more embodiments, processor 1102 is a central processing unit (CPU), a multi-processor, a distributed processing system, an application specific integrated circuit (ASIC), and/or a suitable processing unit.

In one or more embodiments, computer-readable storage medium 1104 is an electronic, magnetic, optical, electromagnetic, infrared, and/or a semiconductor system (or apparatus or device). For example, computer-readable storage medium 1104 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1104 includes a compact disk-read only memory (CD-ROM), a compact disk-read/write (CD-R/W), and/or a digital video disc (DVD).

In one or more embodiments, storage medium 1104 stores computer program code 1106 configured to cause IC design system 1100 (where such execution represents (at least in part) the EDA tool) to be usable for performing a portion or all of the noted processes and/or methods. In one or more embodiments, storage medium 1104 also stores information which facilitates performing a portion or all of the noted processes and/or methods. In one or more embodiments, storage medium 1104 includes IC design storage 1107 configured to store one or more IC layout diagrams, e.g., an IC layout diagram 200A-600A discussed above with respect to FIGS. 1A-8 and 10.

IC design system 1100 includes I/O interface 1110. I/O interface 1110 is coupled to external circuitry. In one or more embodiments, I/O interface 1110 includes a keyboard, keypad, mouse, trackball, trackpad, touchscreen, and/or cursor direction keys for communicating information and commands to processor 1102.

IC design system 1100 also includes network interface 1112 coupled to processor 1102. Network interface 1112 allows IC design system 1100 to communicate with network 1114, to which one or more other computer systems are connected. Network interface 1112 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC design systems 1100.

IC design system 1100 is configured to receive information through I/O interface 1110. The information received through I/O interface 1110 includes one or more of instructions, data, design rules, libraries of standard cells, and/or other parameters for processing by processor 1102. The information is transferred to processor 1102 via bus 1108. IC design system 1100 is configured to receive information related to a UI through I/O interface 1110. The information is stored in computer-readable medium 1104 as user interface (UI) 1142.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC design system 1100. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 12:
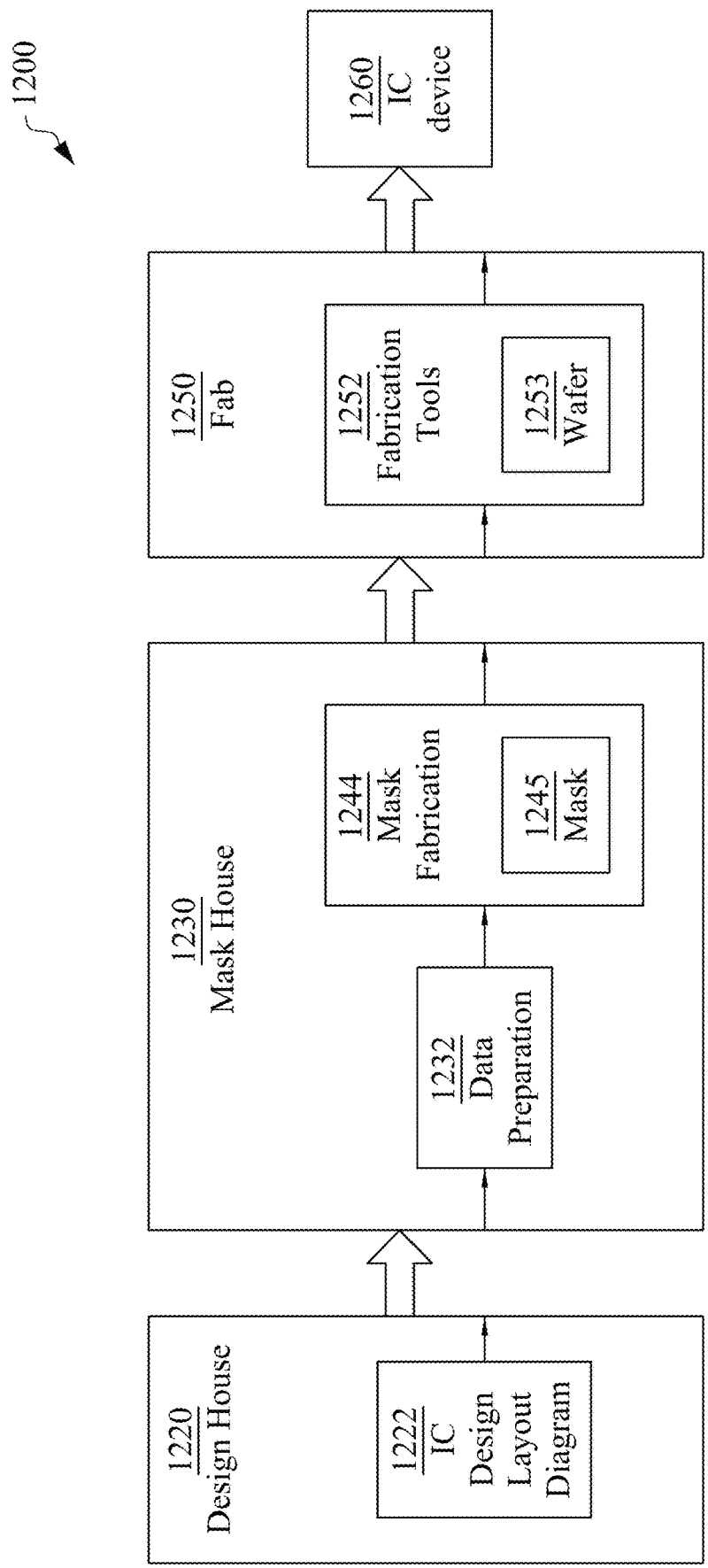
FIG. 12 is a block diagram of an IC manufacturing system, and an IC manufacturing flow associated therewith, in accordance with some embodiments.

FIG. 12 is a block diagram of IC manufacturing system 1200, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 1200.

In FIG. 12, IC manufacturing system 1200 includes entities, such as a design house 1220, a mask house 1230, and an IC manufacturer/fabricator ("fab") 1250, that interact with one another in the design, development, and manufacturing cycles and/or services related to manufacturing an IC device 1260. The entities in system 1200 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1220, mask house 1230, and IC fab 1250 is owned by a single larger company. In some embodiments, two or more of design house 1220, mask house 1230, and IC fab 1250 coexist in a common facility and use common resources.

Design house (or design team) 1220 generates an IC design layout diagram 1222. IC design layout diagram 1222 includes various geometrical patterns, e.g., an IC layout diagram discussed above. The geometrical patterns correspond to patterns of metal, oxide, or semiconductor layers that make up the various components of IC device 1260 to be fabricated. The various layers combine to form various IC features. For example, a portion of IC design layout diagram 1222 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1220 implements a proper design procedure to form IC design layout diagram 1222. The design procedure includes one or more of logic design, physical design or place and route. IC design layout diagram 1222 is presented in one or more data files having information of the geometrical patterns. For example, IC design layout diagram 1222 can be expressed in a GDSII file format or DFII file format.

Mask house 1230 includes data preparation 1232 and mask fabrication 1244. Mask house 1230 uses IC design layout diagram 1222 to manufacture one or more masks 1245 to be used for fabricating the various layers of IC device 1260 according to IC design layout diagram 1222. Mask house 1230 performs mask data preparation 1232, where IC design layout diagram 1222 is translated into a representative data file (RDF). Mask data preparation 1232 provides the RDF to mask fabrication 1244. Mask fabrication 1244 includes a mask writer. A mask writer converts the RDF to an image on a substrate, such as mask (reticle) 1245 or a semiconductor wafer 1253. The design layout diagram 1222 is manipulated by mask data preparation 1232 to comply with particular characteristics of the mask writer and/or requirements of IC fab 1250. In FIG. 12, mask data preparation 1232 and mask fabrication 1244 are illustrated as separate elements. In some embodiments, mask data preparation 1232 and mask fabrication 1244 can be collectively referred to as mask data preparation.

In some embodiments, mask data preparation 1232 includes optical proximity correction (OPC) which uses lithography enhancement techniques to compensate for image errors, such as those that can arise from diffraction, interference, other process effects and the like. OPC adjusts IC design layout diagram 1222. In some embodiments, mask data preparation 1232 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1232 includes a mask rule checker (MRC) that checks the IC design layout diagram 1222 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1222 to compensate for limitations during mask fabrication 1244, which may undo part of the modifications performed by OPC in order to meet mask creation rules.

In some embodiments, mask data preparation 1232 includes lithography process checking (LPC) that simulates processing that will be implemented by IC fab 1250 to fabricate IC device 1260. LPC simulates this processing based on IC design layout diagram 1222 to create a simulated manufactured device, such as IC device 1260. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1222.

It should be understood that the above description of mask data preparation 1232 has been simplified for the purposes of clarity. In some embodiments, data preparation 1232 includes additional features such as a logic operation (LOP) to modify the IC design layout diagram 1222 according to manufacturing rules. Additionally, the processes applied to IC design layout diagram 1222 during data preparation 1232 may be executed in a variety of different orders.

After mask data preparation 1232 and during mask fabrication 1244, a mask 1245 or a group of masks 1245 are fabricated based on the modified IC design layout diagram 1222. In some embodiments, mask fabrication 1244 includes performing one or more lithographic exposures based on IC design layout diagram 1222. In some embodiments, an electron-beam (e-beam) or a mechanism of multiple e-beams is used to form a pattern on a mask (photomask or reticle) 1245 based on the modified IC design layout diagram 1222. Mask 1245 can be formed in various technologies. In some embodiments, mask 1245 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 1245 includes a transparent substrate (e.g., fused quartz) and an opaque material (e.g., chromium) coated in the opaque regions of the binary mask. In another example, mask 1245 is formed using a phase shift technology. In a phase shift mask (PSM) version of mask 1245, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1244 is used in a variety of processes. For example, such a mask(s) is used in an ion implantation process to form various doped regions in semiconductor wafer 1253, in an etching process to form various etching regions in semiconductor wafer 1253, and/or in other suitable processes.

IC fab 1250 is an IC fabrication business that includes one or more manufacturing facilities for the fabrication of a variety of different IC products. In some embodiments, IC Fab 1250 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1250 includes wafer fabrication tools 1252 configured to execute various manufacturing operations on semiconductor wafer 1253 such that IC device 1260 is fabricated in accordance with the mask(s), e.g., mask 1245. In various embodiments, fabrication tools 1252 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1250 uses mask(s) 1245 fabricated by mask house 1230 to fabricate IC device 1260. Thus, IC fab 1250 at least indirectly uses IC design layout diagram 1222 to fabricate IC device 1260. In some embodiments, semiconductor wafer 1253 is fabricated by IC fab 1250 using mask(s) 1245 to form IC device 1260. In some embodiments, the IC fabrication includes performing one or more lithographic exposures based at least indirectly on IC design layout diagram 1222. Semiconductor wafer 1253 includes a silicon substrate or other proper substrate having material layers formed thereon. Semiconductor wafer 1253 further includes one or more of various doped regions, dielectric features, multi-level interconnects, and the like (formed at subsequent manufacturing steps).

Details regarding an IC manufacturing system (e.g., system 1200 of FIG. 12), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an IC device includes a transistor and a metal fuse structure including a metal fuse electrically connected to the transistor and a first metal line in parallel with the metal fuse and adjacent to a first portion of the metal fuse in a first direction. The first portion has a first width, and the metal fuse includes a second portion having a second width larger than the first width, and a first contour between the first and second portions and aligned with a first end of the first metal line.

In some embodiments, a memory array includes a plurality of bit cells, each bit cell of the plurality of bit cells including a program node, a bit line, and a metal fuse structure including a first metal line coupled between the program node and the bit line and extending from a first end to a second end, and second and third metal lines, each of the second and third metal lines extending parallel to and adjacent to the first metal line. The first through third metal lines are coextensive throughout a first overlay region having a first overlay length, the first metal line is coextensive solely with the second metal line over a first portion between the first overlay region and the first end and coextensive solely with the third metal line over a second portion between the first overlay region and the second end, the first metal line has a first width in the first overlay region and a second width outside the first overlay region, and the first width is smaller than the second width.

In some embodiments, a method of manufacturing an IC device includes forming a first spacer based on a first mask having a first pattern corresponding to a first metal line in a first metal layer extending in a first direction, forming a second mask having a second pattern corresponding to a second metal line in the first metal layer, wherein the second metal line extends in the first direction and overlaps the first spacer, forming the first and second metal lines in the first metal layer based on the first and second patterns, and constructing an electrical connection between an end of the second metal line and a S/D terminal of a metal fuse bit transistor, wherein forming the second metal line includes forming a first contour aligned with an end of the first metal line and the first spacer.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit (IC) device comprising:
a transistor; and
a metal fuse structure comprising:
a metal fuse electrically connected to the transistor;
a first metal line positioned in parallel with the metal fuse in a same metal layer as the metal fuse, adjacent to a first portion of the metal fuse in a first direction, electrically isolated from the metal fuse and the transistor, and comprising a convex shape at a first end; and
a dielectric layer between the metal fuse and the first metal line,
wherein
the first portion has a first width,
the metal fuse comprises:
a second portion having a second width larger than the first width; and
a first contour between the first and second portions and aligned with the first end of the first metal line, and
the first contour comprises a shape that conforms to the convex shape of the first end of the first metal line and is separated from the convex shape of the first end of the first metal line by a uniform thickness of the dielectric layer.

2. The IC device of claim 1, wherein
the metal fuse structure further comprises a second metal line in parallel with the metal fuse and adjacent to the first and second portions in a second direction opposite the first direction, and
the metal fuse further comprises:
a third portion having a third width larger than the first width; and
a second contour between the first and third portions and aligned with a first end of the second metal line.

3. The IC device of claim 2, wherein the first and second metal lines are electrically isolated from each other and from the metal fuse and the transistor.

4. The IC device of claim 2, wherein an entirety of the metal fuse is adjacent to one or both of the first or second metal lines.

5. The IC device of claim 2, wherein the third width is approximately equal to the second width.

6. The IC device of claim 2, wherein the metal fuse structure further comprises:
a third metal line in parallel with the metal fuse and adjacent to fourth and fifth portions of the metal fuse in the second direction, wherein
the fourth portion has the first width,
the fifth portion has the second width, and
the metal fuse further comprises:
a third contour between the second and fourth portions and aligned with a first end of the third metal line, and
a fourth contour between the fourth and fifth portions and aligned with a second end of the first metal line.

7. The IC device of claim 6, wherein the first, second, and third metal lines are electrically isolated from each other and from the metal fuse and the transistor.

8. The IC device of claim 6, wherein an entirety of the metal fuse is adjacent to one or both of the first or second metal lines or one or both of the first or third metal lines.

9. The IC device of claim 1, wherein the metal fuse further comprises:
a third portion having the second width; and
a second contour between the first and third portions and aligned with a second end of the first metal line.

10. The IC device of claim 1, wherein each of the first contour and the first end of the first metal line comprises an arc.

11. A memory array comprising a plurality of bit cells, each bit cell of the plurality of bit cells comprising:
a program node;
a bit line; and
a metal fuse structure comprising:
a first metal line coupled between the program node and the bit line and extending from a first end to a second end; and
second and third metal lines, each of the second and third metal lines being electrically isolated from the first metal line by a dielectric layer and extending parallel to and adjacent to the first metal line,
wherein
the first through third metal lines are coextensive throughout a first overlay region having a first overlay length between a third end of the second metal line and a fourth end of the third metal line,
the first metal line is coextensive solely with the second metal line over a first portion between the first overlay region and the first end and coextensive solely with the third metal line over a second portion between the first overlay region and the second end, the first metal line has a first width in the first overlay region and a second width outside the first overlay region, the first width is smaller than the second width, and the first metal line comprises:
- a first contour between the first and second widths, the first contour comprising a first shape that conforms to a shape of the third end of the second metal line and is separated from the shape of the third end of the second metal line by a first uniform thickness of the dielectric layer; and
- a second contour between the first and second widths, the second contour comprising a second shape that conforms to a shape of the fourth end of the third metal line and is separated from the shape of the fourth end of the third metal line by a second uniform thickness of the dielectric layer.

12. The memory array of claim 11, wherein the metal fuse structure further comprises:

a fourth metal line extending parallel to and adjacent to the first metal line and aligned with the third metal line, wherein the first, second, and fourth metal lines are coextensive throughout a second overlay region having a second overlay length, the first metal line is coextensive solely with the fourth metal line over a third portion between the second overlay region and the first end, and the first metal line has the first width in the second overlay region.

13. The memory array of claim 12, wherein the first overlay length is approximately equal to the second overlay length.

14. The memory array of claim 11, wherein at least one of the first portion is an entirety of the first metal line between the first overlay region and the first end, or the second portion is an entirety of the first metal line between the first overlay region and the second end.

15. The memory array of claim 11, wherein each of the second and third metal lines of each bit cell of the plurality of bit cells is configured to float during program and read operations of the memory array.

16. An integrated circuit (IC) device comprising:

a transistor; and a metal fuse structure comprising:
- a first metal line coupled to a source/drain terminal of the transistor and extending from a first end to a second end in a metal layer; and second and third metal lines, each of the second and third metal lines being electrically isolated from the first metal line by a dielectric layer and extending parallel to and adjacent to the first metal line in the metal layer, wherein the first through third metal lines are coextensive throughout a first overlay region having a first overlay length between a third end of the second metal line and a fourth end of the third metal line, the first metal line is coextensive solely with the second metal line over a first portion between the first overlay region and the first end and coextensive solely with the third metal line over a second portion between the first overlay region and the second end, the first metal line has a first width in the first overlay region and a second width outside the first overlay region, the first width is smaller than the second width, and the first metal line comprises:
- a first contour between the first and second widths, the first contour comprising a first shape that conforms to a shape of the third end of the second metal line and is separated from the shape of the third end of the second metal line by a first uniform thickness of the dielectric layer; and
- a second contour between the first and second widths, the second contour comprising a second shape that conforms to a shape of the fourth end of the third metal line and is separated from the shape of the fourth end of the third metal line by a second uniform thickness of the dielectric layer.

17. The IC device of claim 16, wherein the transistor comprises an n-type metal-oxide semiconductor (NMOS) transistor.

18. The IC device of claim 16, wherein the metal layer comprises a metal layer above a second metal layer of the IC device.

19. The IC device of claim 16, wherein the first metal line has a third width greater than the second width outside the first overlay region and each of the first and second portions.

20. The IC device of claim 1, wherein the transistor comprises an n-type metal-oxide semiconductor (NMOS) transistor.

* * * * *